(12) United States Patent
Macbeth et al.

(10) Patent No.: US 8,392,229 B2
(45) Date of Patent: Mar. 5, 2013

(54) ACTIVITY-CENTRIC GRANULAR APPLICATION FUNCTIONALITY

(75) Inventors: Steven W. Macbeth, Snohomish, WA (US); Roland L. Fernandez, Woodinville, WA (US); Brian R. Meyers, Issaquah, WA (US); Desney S. Tan, Kirkland, WA (US); George G. Robertson, Seattle, WA (US); Nuria M. Oliver, Seattle, WA (US); Oscar E. Murillo, Seattle, WA (US); Elin R. Pedersen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/168,176

(22) Filed: Jun. 24, 2011

(65) Prior Publication Data

US 2011/0264484 A1    Oct. 27, 2011

Related U.S. Application Data

(63) Continuation of application No. 11/426,788, filed on Jun. 27, 2006, now Pat. No. 7,970,637.

(51) Int. Cl.
*G06Q 10/00* (2012.01)
(52) U.S. Cl. ....... 705/7.11; 705/7.12; 717/106; 717/107
(58) Field of Classification Search ................ 705/7.11, 705/7.12; 715/850–865; 717/100–109
See application file for complete search history.

(56) References Cited

U.S. PATENT DOCUMENTS

| | | | |
|---|---|---|---|
| 6,233,570 B1 | 5/2001 | Horvitz et al. | |
| 6,456,974 B1 | 9/2002 | Baker et al. | |
| 6,601,233 B1* | 7/2003 | Underwood | 717/102 |
| 6,757,887 B1* | 6/2004 | Kaplan et al. | 717/106 |
| 7,017,146 B2* | 3/2006 | Dellarocas et al. | 717/106 |
| 7,155,700 B1* | 12/2006 | Sadhu et al. | 717/103 |
| 7,194,726 B2* | 3/2007 | Allen et al. | 717/104 |
| 7,331,034 B2* | 2/2008 | Anderson | 717/103 |
| 7,363,282 B2* | 4/2008 | Karnawat et al. | 706/45 |
| 7,389,514 B2* | 6/2008 | Russell et al. | 719/315 |
| 7,562,346 B2* | 7/2009 | Jhanwar et al. | 717/120 |
| 7,562,347 B2* | 7/2009 | Baumgart et al. | 717/120 |
| 2001/0040590 A1* | 11/2001 | Abbott et al. | 345/700 |
| 2002/0007289 A1* | 1/2002 | Malin et al. | 705/4 |
| 2002/0054097 A1 | 5/2002 | Hetherington et al. | |
| 2003/0078826 A1 | 4/2003 | Swanke et al. | |
| 2003/0144868 A1 | 7/2003 | MacIntyre et al. | |
| 2003/0182651 A1* | 9/2003 | Secrist et al. | 717/120 |
| 2004/0039627 A1* | 2/2004 | Palms et al. | 705/9 |
| 2004/0093593 A1* | 5/2004 | Jhanwar et al. | 717/169 |
| 2005/0091635 A1* | 4/2005 | McCollum et al. | 717/101 |
| 2005/0091647 A1* | 4/2005 | McCollum et al. | 717/130 |

(Continued)

OTHER PUBLICATIONS

Qin, Shengchao; He, Jifeng; Chin, Wei Ngan "Towards an Automated Approach to Hardware/Software Decomposition" DSpace@MIT, Issue Date Jan. 2003.*

(Continued)

*Primary Examiner* — Johnna Loftis
*Assistant Examiner* — Alan S Miller
(74) *Attorney, Agent, or Firm* — Shook Hardy & Bacon LLP

(57) ABSTRACT

A system that can enable the atomization of application functionality in connection with an activity-centric system is provided. The system can be utilized as a programmatic tool that decomposes an application's constituent functionality into atoms thereafter monitoring and aggregating atoms with respect to a particular activity. In doing so, the functionality of the system can be scaled based upon complexity and needs of the activity. Additionally, the system can be employed to monetize the atoms or activity capabilities based upon respective use.

20 Claims, 11 Drawing Sheets

U.S. PATENT DOCUMENTS

| | | | |
|---|---|---|---|
| 2005/0138603 A1* | 6/2005 | Cha et al. | 717/120 |
| 2005/0210441 A1* | 9/2005 | Tarr et al. | 717/101 |
| 2006/0015478 A1* | 1/2006 | Beringer et al. | 707/2 |
| 2006/0015479 A1* | 1/2006 | Wood et al. | 707/2 |
| 2006/0026531 A1 | 2/2006 | Lin et al. | |
| 2006/0168550 A1* | 7/2006 | Muller et al. | 715/866 |
| 2006/0242651 A1* | 10/2006 | Zielinski et al. | 719/318 |
| 2006/0282436 A1* | 12/2006 | Chaudhuri et al. | 707/100 |
| 2006/0293933 A1* | 12/2006 | Millhouse et al. | 705/7 |
| 2007/0033640 A1* | 2/2007 | Herness et al. | 726/5 |
| 2007/0168885 A1* | 7/2007 | Muller et al. | 715/853 |
| 2007/0198969 A1* | 8/2007 | Facemire et al. | 717/107 |
| 2007/0276715 A1* | 11/2007 | Beringer et al. | 705/7 |

OTHER PUBLICATIONS

Chung-Horng Lung; Xia Xu; Marzia Zaman "Software Architecture Decomposition Using Attributes" International Journal of Software Engineering and Knowledge Engineering vol. 17, Issue: 5(2007) pp. 599-613 Accepted Oct. 16, 2006.*

Sean Zhang; Barbara G. Ryder; William Landi "Program Decomposition for Pointer Aliasing: A Step toward Practical Analyses" SIGSOFT'96 CA, USA © 1996 ACM 0-89791-797-9/96/0010.*

Bardram, Jakob E. "Activity-based computing: support for mobility and collaboration in ubiquitous computing" Pers Ubiquit Comput (2005) 9: 312-322 Springer-Verlag London Limited 2005.*

Bardram, Jakob E.; Christensen, Henrik Baerbak "Real-time Collaboration in Activity-based Architectures" Proceedings of the Fourth Working IEEE/IFIP Conference on Software Architecture (WICSA'04) 0-7695-2172-X/04 © 2004 IEEE.*

Bardram, Jakob E.; Bunde-Pedersen, Jonathan; Soegaard, Mads "Support for ActivityBased Computing in a Personal Computing Operating System" CHI 2006 Proceedings • Activity: Design Implications Apr. 22-27, 2006 • Montréal, Québec, Canada.*

Bardram, Jakob E.; Kjaer, Rasmus E.; Pedersen, Michael "Context-Aware User Authentication—Supporting Proximity-Based Login in Pervasive Computing" A.K. Dey et al. (Eds.): UbiComp 2003, LNCS 2864, pp. 107-123, 2003. Springer-Verlag Berlin Heidelberg 2003.*

Final Office Action in U.S. Appl. No. 11/426,832 mailed Dec. 22, 2010.

NonFinal Office Action, Mailed: Aug. 1, 2011, U.S. Appl. No. 11/426,832.

Office Action in U.S. Appl. No. 11/426,818 mailed Apr. 26, 2011.

Final Office Action, U.S. Appl. No. 11/426,818, mailed:Aug. 16, 2011.

Notice of Allowance in U.S. Appl. No. 11/426,818, mailed Aug. 22, 2012.

Final Office Action, U.S. Appl. No. 11/426,832 mailed Jan. 6, 2012.

Chung-Horng_Lung;_Xia_Xu;_Marzia_Zaman_"Software_Architecture_Decomposition_Using_Attributes"_international_Journal_of_Software_Engineering_and_Knowledge_Engineering_vol._17,_Issue:_5(2007)_pp. 599-613_Accepted_Oct. 16, 2006.

Bardram,_Jakob_E.;_Kjaer,_Rasmus_E.;_Pedersen,_Michael_"Context-Aware_User_Authentication—Supporting_Proximity-Based_Login_in_Pervasive_Computing"_A.K._Dey_et_al._(Eds.):_UbiComp_2003,_LNCS_2864,_pp. 107-123,_2003,_Springer-Verlag_Berlin_Heidelberg_200.

* cited by examiner

ACTIVITY-CENTRIC GRANULAR APPLICATION FUNCTIONALITY

CROSS REFERENCE TO RELATED APPLICATION(S)

This application is a continuation of and claims benefit of priority to U.S. patent application Ser. No. 11/426,788, filed on Jun. 27, 2006, entitled ACTIVITY-CENTRIC GRANULAR APPLICATION FUNCTIONALITY, which application is herein incorporated by reference. This application is related by subject matter to U.S. patent application Ser. No. 11/426,846 filed on Jun. 27, 2006, entitled "LOGGING USER ACTIONS WITHIN ACTIVITY CONTEXT", U.S. patent application Ser. No. 11/426,839 filed on Jun. 27, 2006, entitled "RESOURCE AVAILABILITY FOR USER ACTIVITIES ACROSS DEVICES," U.S. patent application Ser. No. 11/426,832 filed on Jun. 27, 2006, entitled "CAPTURE OF PROCESS KNOWLEDGE FOR USER ACTIVITIES", U.S. patent application Ser. No. 11/426,830 filed on Jun. 27, 2006, entitled "PROVIDING USER INFORMATION TO INTROSPECTION", U.S. patent application Ser. No. 11/426,818 filed on Jun. 27, 2006, entitled "MONITORING GROUP ACTIVITIES", U.S. patent application Ser. No. 11/426,810 filed on Jun. 27, 2006, entitled "MANAGING ACTIVITY-CENTRIC ENVIRONMENTS VIA USER PROFILES", U.S. patent application Ser. No. 11/426,827 filed on Jun. 27, 2006, entitled "CREATING AND MANAGING ACTIVITY-CENTRIC WORKFLOW", U.S. patent application Ser. No. 11/426,804 filed on Jun. 27, 2006, entitled "ACTIVITY-CENTRIC ADAPTIVE USER INTERFACE", and U.S. patent application Ser. No. 11/426,796 filed on Jun. 27, 2006, entitled "ACTIVITY-CENTRIC DOMAIN SCOPING". The entirety of each of the above applications is incorporated herein by reference.

BACKGROUND

Conventionally, communications between humans and machines has not been natural. Human-human communication typically involves spoken language combined with hand and facial gestures or expressions, and with the humans understanding the context of the communication. Human-machine communication is typically much more constrained, with devices like keyboards and mice for input, and symbolic or iconic images on a display for output, and with the machine understanding very little of the context. For example, although communication mechanisms (e.g., speech recognition systems) continue to develop, these systems do not automatically adapt to the activity of a user. As well, traditional systems do not consider contextual factors (e.g., user state, application state, environment conditions) to improve communications and interactivity between humans and machines.

Activity-centric concepts are generally directed to ways to make interaction with computers more natural (by providing some additional context for the communication). Traditionally, computer interaction centers around one of three pivots, 1) document-centric, 2) application-centric, and 3) device-centric. However, most conventional systems cannot operate upon more than one pivot simultaneously, and those that can do not provide much assistance managing the pivots. Hence, users are burdened with the tedious task of managing every little aspect of their tasks/activities.

A document-centric system refers to a system where a user first locates and opens a desired data file before being able to work with it. Similarly, conventional application-centric systems refer to first locating a desired application, then opening and/or creating a file or document using the desired application. Finally, a device-centric system refers to first choosing a device for a specific activity and then finding the desired application and/or document and subsequently working with the application and/or document with the chosen device.

Accordingly, since the traditional computer currently has little or no notion of activity built in to it, users are provided little direct support for translating the "real world" activity they are trying to use the computer to accomplish and the steps, resources and applications necessary on the computer to accomplish the "real world" activity. Thus, users traditionally have to assemble "activities" manually using the existing pieces (e.g., across documents, applications, and devices). As well, once users manually assemble these pieces into activities, they need to manage this list mentally, as there is little or no support for managing this on current systems.

All in all, the activity-centric concept is based upon the notion that users are leveraging a computer to complete some real world activity. Historically, a user has had to outline and prioritize the steps or actions necessary to complete a particular activity mentally before starting to work on that activity on the computer. Conventional systems do not provide for systems that enable the identification and decomposition of actions necessary to complete an activity. In other words, there is currently no integrated mechanism available that can dynamically understand what activity is taking place as well as what steps or actions are necessary to complete the activity.

Most often, the conventional computer system has used the desktop metaphor, where there was only one desktop. Moreover, these systems stored documents in a single filing cabinet. As the complexity of activities rises, and as the similarity of the activities diverges, this structure does not offer user-friendly access to necessary resources for a particular activity.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that can atomize the functionality of an application in connection with an activity-centric system. The system can be utilized as a programmatic tool that decomposes an application's constituent functionality into atoms thereafter monitoring and aggregating atoms with respect to a particular activity. In doing so, the functionality of the system can be scaled based upon complexity and needs of the activity.

In other aspects, the system can be employed to monetize the atoms or activity capabilities based upon respective use. The monetization can be based upon any number of factors including, but not limited to, time of use, duration of use, number of uses, scope of functionality, etc. In each case, the system can dynamically track monetization factors with respect to individual activity capabilities.

Yet other aspects disclose an activity frame generator and activity frame (e.g., template) that identifies activity capabilities. For example, the activity frame can identify activity capabilities that correspond to the particular activity. In one embodiment, the activity frame can be established in an ad hoc fashion where activity capabilities are added as they are accessed. In other embodiments, templates can be pre-defined in order to identify associated activity capabilities.

In still other aspects, search mechanisms can be employed to query activity capabilities based upon requirements, needs and/or desires related to an activity. Further, machine learning and reasoning mechanisms can be employed to automate and/or infer an action on behalf of a user.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
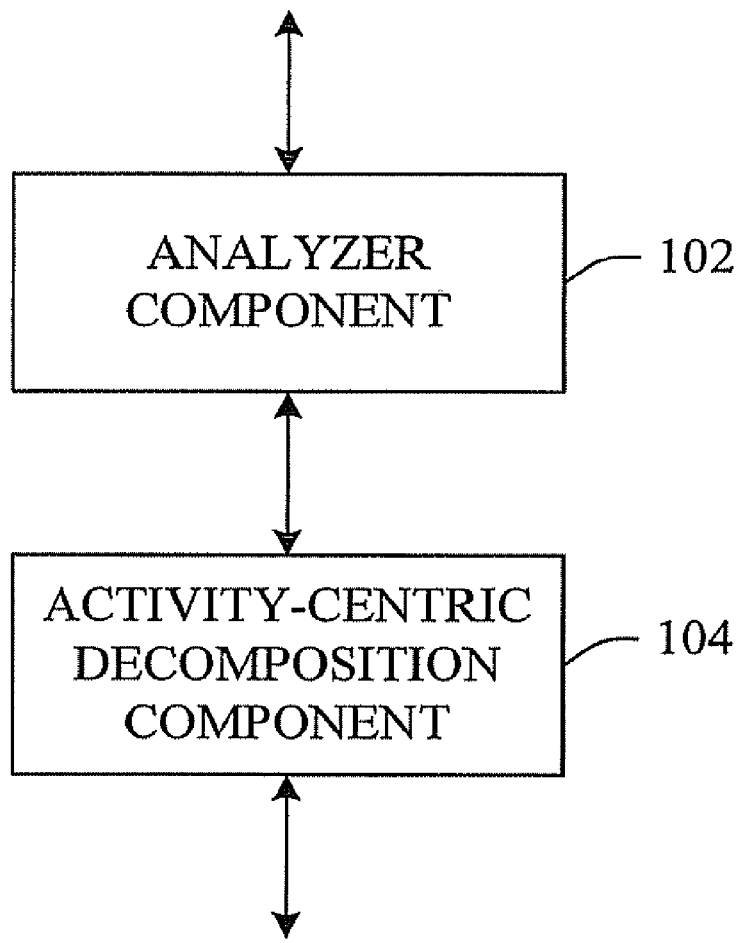
FIG. 1 illustrates a system that facilitates activity-centric decomposition system in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a block diagram of a system 100 that facilitates atomizing application functionality around user activities in accordance with an aspect of the innovation. Effectively, system 100 can employ most any level of granularity to manage the structure (e.g., functionality) of an application within an activity-centric system. In operation, system 100 describes a novel way that applications can be structured within an activity-centric environment. More particularly, the system 100 discloses a manner in which applications can be built and/or structured in a more atomic manner thus enabling portions of an application to be utilized as needed or desired.

Generally, system 100 can include an analyzer component and an activity-centric decomposition component 102. The analyzer component 102 can explore the functionality and structure of an application whereas the activity-centric decomposition component 104 can separate (e.g., atomize) the functionality into smaller, focused functionality segments (e.g., atoms). In one example, the analyzer component 102 can evaluate a word processing application thereafter enabling the activity-centric decomposition component 104 to segment functionality into atoms. More particularly, in one aspect, the word processing application can be segmented into two high level functionality categories, document creation and document review/edit.

In other aspects, the granularity of the decomposition can be managed via rules, preferences and/or machine learning and/or reasoning mechanisms. In each case, activity capabilities can be identified by the activity-centric decomposition component 104. In general, these activity capabilities can be defined as services and views associated with the application. The services can include functionality aspects as well as resource aspects. The views can be described as mechanisms to display the functionality aspects to a user.

The innovation provides for the functionality of an application to be built in a more granular manner thereby enabling specific functionalities from a single and/or multiple applications to be combined within the activity-centric environment. The innovation addresses the primary components of an application that can be atomized in accordance with the novel model. For example, the system can enable access to the resources that are necessary for an application or an activity. The innovation can also atomize the views that an application can expose to display resources and/or utilize functionality.

In an embodiment, the innovation can decompose the functionality and views of an application thereby enabling use of the functionality and views outside of the context of the application. Although FIG. 1 illustrates the functionality of analyzing and decomposing application components, it is to be understood that other aspects provide for a framework that enables a developer to initially craft computer applications into individual services and views. In either case, the granularity of the segmentation can vary based upon factors such as preference, need, activity, etc. The activity-centric system 100 can become the application frame (e.g., template) for resources, functionalities and/or views. Effectively, the frame enables access to resources (e.g., files, fonts, graphics) associated with an activity.

Figure 2:
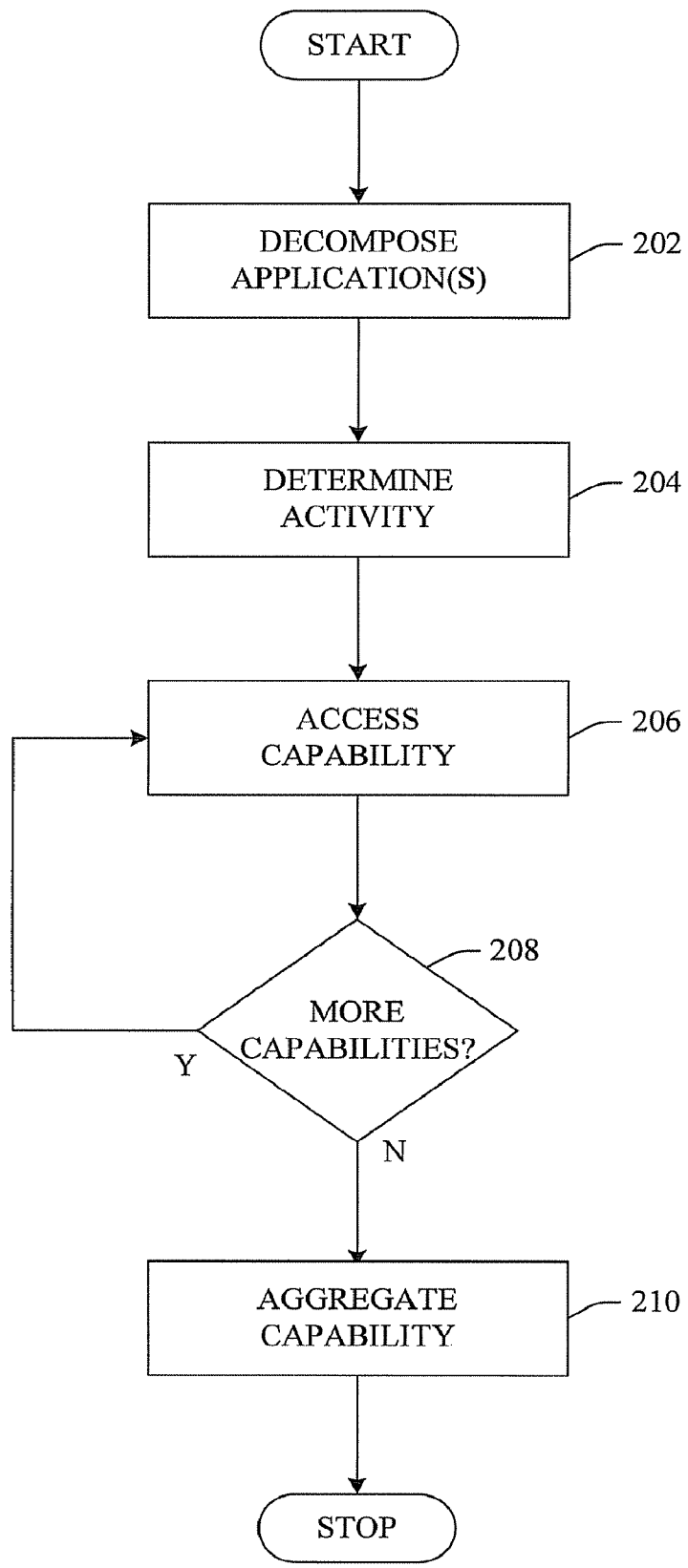
FIG. 2 illustrates a flow chart of procedures that facilitate activity-centric decomposition and aggregation of capabilities in accordance with an aspect of the innovation.

FIG. 2 illustrates a methodology of associating application capabilities with activities in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, an application can be decomposed into separate activity capabilities (e.g., services and views). As described with reference to FIG. 1 above, in aspects, services can include functionality and/or resources associated to an application. Similarly, views can be representative mechanisms that enable rendering of the services to a user. Continuing with the word processing application example from above, services can include functionality such as spell checking, printing, etc. As well, a more granular level of functionality can be applied whereas functionalities can include mail merge, font/paragraph formatting, or the like. Views can include UI elements like dialogs, document views, and toolbars. It is to be understood that the application author (or decomposition component) can designate services and views at a low level (and fixed size).

With reference again to the methodology of FIG. 2, an activity can be determined at 204. As described in detail with reference to the Related Applications set forth above, the activity can be explicitly determined by a user and/or inferred based upon gathered information such as activity context, user context, environment context, device profile, extrinsic factors or the like.

In accordance with the identification of the activity at 204, a capability (e.g., service, view) can be accessed at 206. It is to be understood that the action of accessing capabilities can be recursive in order to gather multiple capabilities related to the activity defined at 204. As illustrated by the decision block 208 of FIG. 2, the act of accessing capabilities can be repeated until a fixed number of capabilities are gathered. Accordingly, at 210, the gathered capabilities can be aggregated with respect to the activity defined (e.g., determined, inferred) in 204. This aggregation demonstrates scalability of the activity-centric granular application functionality of the subject innovation.

Figure 3:
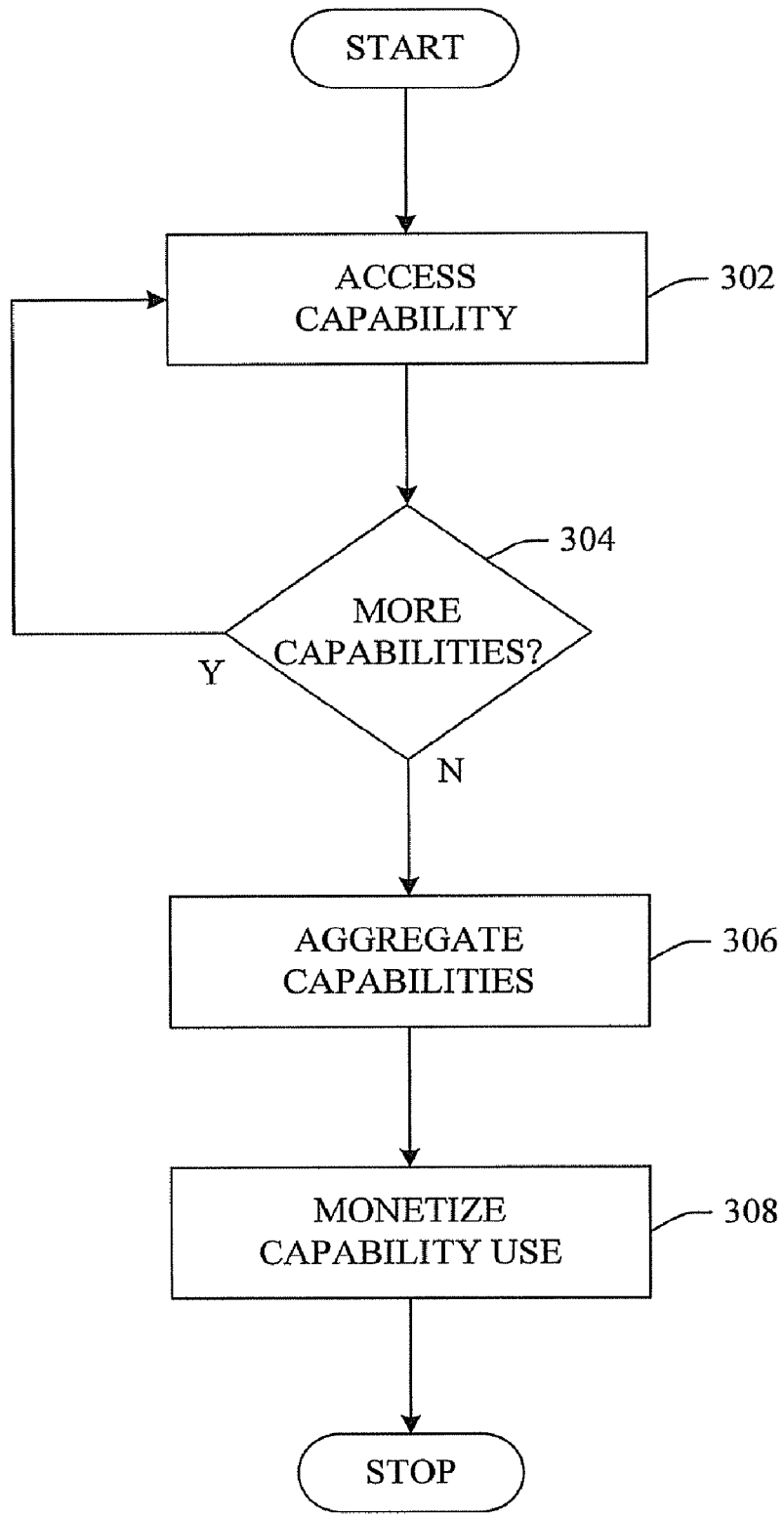
FIG. 3 illustrates an alternative flow chart of procedures that facilitate activity-centric monetization and aggregation in accordance with an aspect of the innovation.

One particularly novel feature of the innovation is to enable the ability to monetize capability use in accordance with an activity. Turning now to FIG. 3, a methodology of monetizing the capabilities in accordance with an aspect is shown. More particularly, at 302, based at least in part upon a determined activity, a capability can be accessed. For example, suppose the activity involves preparation of a mass mailing, at 302, the capabilities can be high level services such as letter writing functionality. Similarly, the capability can include lower level services such as mail merge functionalities.

As described above with reference to FIG. 2, activity centric capability access can be a recursive process based upon the identified activity. It will be understood, that in alternative aspects, the corresponding activity can be a past, current or future activity. In each instance, capabilities can be gathered and aggregated as shown at 304 and 306.

The use of the capabilities can be monetized at 308. For example, monetization can include charging a flat fee for the use of a particular capability. In another example, monetization can be based upon an access timeframe or term associated with the use of a capability or group of capabilities. It is to be understood that monetization factors can be tailored based upon most any criteria including, but not limited to, scope of use, time of use, term of use, nature of use, etc.

Figure 4:
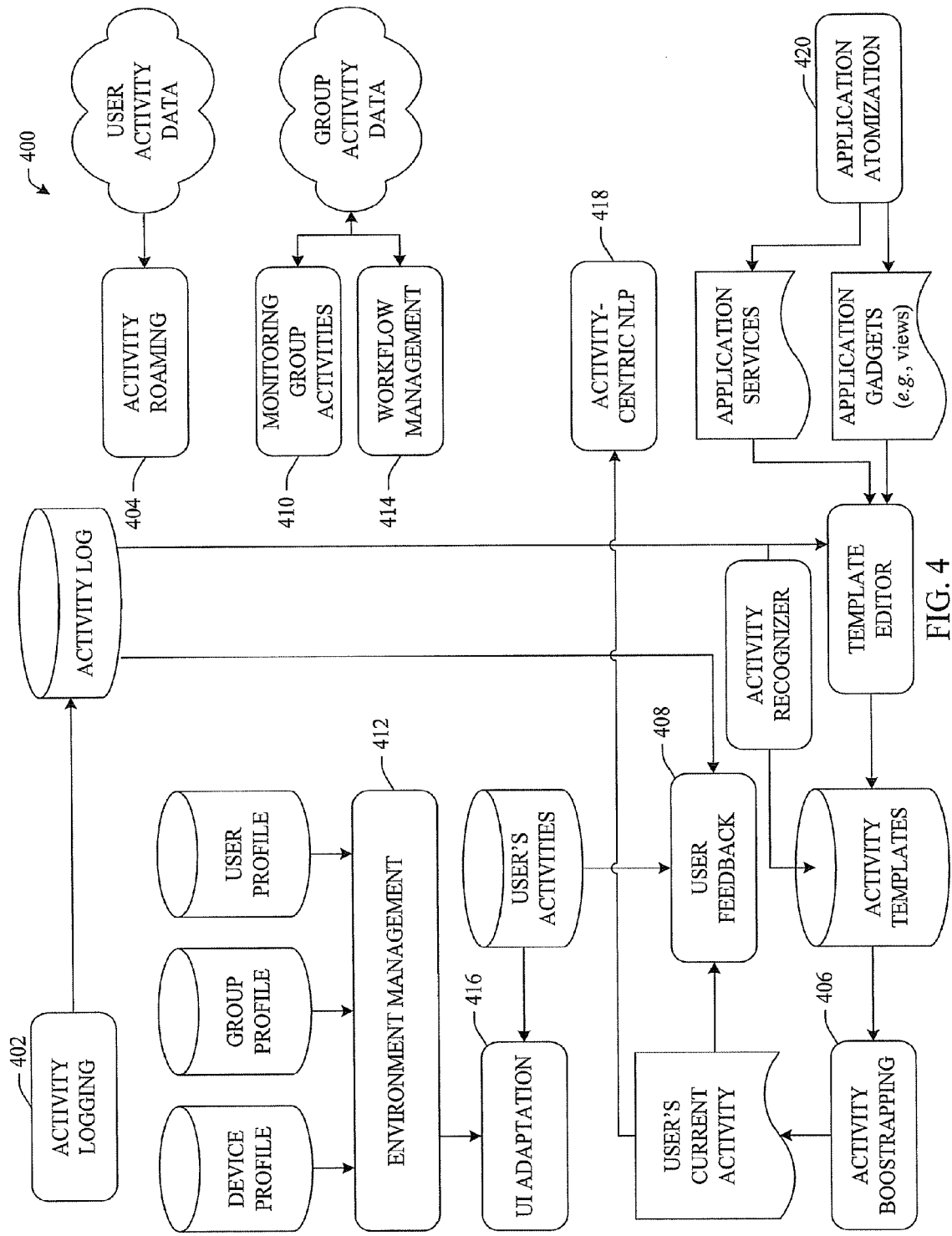
FIG. 4 illustrates a block diagram of an overall activity-centric system in accordance with an aspect of the innovation.

Turning now to FIG. 4, an overall activity-centric system 400 operable to perform novel functionality described herein is shown. As well, it is to be understood that the activity-centric system of FIG. 4 is illustrative of an exemplary system capable of performing the novel functionality of the Related Applications identified supra and incorporated by reference herein. Novel aspects of each of the components of system 400 are described below.

The novel activity-centric system 400 can enable users to define and organize their work, operations and/or actions into units called "activities." Accordingly, the system 400 offers a user experience centered on those activities, rather than pivoted based upon the applications and files of traditional systems. The activity-centric system 400 can also usually include a logging capability, which logs the user's actions for later use.

In accordance with the innovation, an activity typically includes or links to all the resources needed to perform the activity, including tasks, files, applications, web pages, people, email, and appointments. Some of the benefits of the activity-centric system 400 include easier navigation and management of resources within an activity, easier switching between activities, procedure knowledge capture and reuse, improved management of activities and people, and improved coordination among team members and between teams.

As described herein and illustrated in FIG. 4, the system 400 discloses an extended activity-centric system. However, the particular innovation (e.g., enabling aggregation and monetization of capabilities based upon an activity) disclosed herein is part of the larger, extended activity-centric system 400. An overview of this extended system 400 follows.

The "activity logging" component 402 can log the user's actions on a device to a local (or remote) data store. By way of example, these actions can include, but are not limited to include, resources opened, files changed, application actions, etc. As well, the activity logging component 402 can also log current activity and other related information. This data can be transferred to a server that holds the user's aggregated log information from all devices used. The logged data can later be used by the activity system in a variety of ways.

The "activity roaming" component 404 is responsible for storing each of the user's activities, including related resources and the "state" of open applications, on a server and making them available to the device(s) that the user is currently using. As well, the resources can be made available for use on devices that the user will use in the future or has used in the past. The activity roaming component 404 can accept activity data updates from devices and synchronize and/or collaborate them with the server data.

The "activity boot-strapping" component 406 can define the schema of an activity. In other words, the activity boot-strapping component 406 can define the types of items it can contain. As well, the component 406 can define how activity templates can be manually designed and authored. Further, the component 406 can support the automatic generation, and tuning of templates and allow users to start new activities using templates. Moreover, the component 406 is also responsible for template subscriptions, where changes to a template are replicated among all activities using that template.

The "user feedback" component 408 can use information from the activity log to provide the user with feedback on his activity progress. The feedback can be based upon comparing the user's current progress to a variety of sources, including previous performances of this or similar activities (using past activity log data) as well as to "standard" performance data published within related activity templates.

The "monitoring group activities" component 410 can use the log data and user profiles from one or more groups of users for a variety of benefits, including, but not limited to, finding experts in specific knowledge areas or activities, finding users that are having problems completing their activities, identifying activity dependencies and associated problems, and enhanced coordination of work among users through increased peer activity awareness.

The "environment management" component 412 can be responsible for knowing where the user is, the devices that are physically close to the user (and their capabilities), and helping the user select the devices used for the current activity. The component 412 is also responsible for knowing which remote devices might be appropriate to use with the current activity (e.g., for processing needs or printing).

The "workflow management" component 414 can be responsible for management and transfer of work items that involve other users or asynchronous services. The assignment/transfer of work items can be ad-hoc, for example, when a user decides to mail a document to another user for review. Alternatively, the assignment/transfer of work items can be structured, for example, where the transfer of work is governed by a set of pre-authored rules. In addition, the workflow manager 414 can maintain an "activity state" for workflow-capable activities. This state can describe the status of each item in the activity, for example, which it is assigned to, where the latest version of the item is, etc.

The "UI adaptation" component 416 can support changing the "shape" of the user's desktop, applications and views according to the current activity, the available devices, and the user's skills, knowledge, preferences, policies, and various other factors. The contents and appearance of the user's desktop, for example, the applications, resources, windows, and views that are shown, can be controlled by associated information within the current activity. Additionally, applications can query the current activity, the current "step" within the activity, and other user and environment factors, to change their shape and expose or hide specific controls, editors, menus, and other interface elements that comprise the application's user experience.

The "activity-centric recognition" component or "activity-centric natural language processing (NLP)" component 418 can expose information about the current activity, as well as user profile and environment information in order to supply context in a standardized format that can help improve the recognition performance of various technologies, including speech recognition, natural language recognition, optical character recognition, gesture recognition, desktop search, and web search.

Finally, the "application atomization" component 420 represents tools and runtime to support the designing of new applications that consist of services and views. This enables more fine-grained UI adaptation, in terms of template-defined desktops, as well as adapting applications. The services and views designed by these tools can include optional rich behaviors, which allow them to be accessed by users on thin clients, but deliver richer experiences for users on devices with additional capabilities.

In accordance with the activity-centric environment 400, once the computer understands the activity, it can adapt to that activity. For example, if the activity is the review of a multi-media presentation, the application can display the information differently as opposed to an activity of the UI employed in creating a multi-media presentation. All in all, the computer can react and tailor functionality and the UI characteristics based upon a current state and/or activity. The system 400 can understand how to bundle up the work based upon a particular activity. Additionally, the system 400 can monitor actions and automatically bundle them up into an appropriate activity or group of activities. The computer will also be able to associate a particular user to a particular activity, thereby further personalizing the user experience.

In summary, the activity-centric concept of the subject system 400 is based upon the notion that users can leverage a computer to complete some real world activity. As described supra, historically, a user would outline and prioritize the steps or actions necessary to complete a particular activity mentally before starting to work on that activity on the computer. In other words, conventional systems do not provide for systems that enable the identification and decomposition of actions necessary to complete an activity.

The novel activity-centric systems enable automating knowledge capture and leveraging the knowledge with respect to previously completed activities. In other words, in one aspect, once an activity is completed, the subject innovation can infer and remember what steps were necessary when completing the activity. Thus, when a similar or related activity is commenced, the activity-centric system can leverage this knowledge by automating some or all of the steps necessary to complete the activity. Similarly, the system could identify the individuals related to an activity, steps necessary to complete an activity, documents necessary to complete, etc. Thus, a context can be established that can help to complete the activity next time it is necessary to complete. As well, the knowledge of the activity that has been captured can be shared with other users that require that knowledge to complete the same or a similar activity.

Historically, the computer has used the desktop metaphor, where there was effectively only one desktop. Moreover, conventional systems stored documents in a filing cabinet where, there was only one filing cabinet. As the complexity of activities rises, and as the similarity of the activities diverges, it can be useful to have many desktops available that can utilize identification of these similarities in order to streamline activities. Each individual desktop can be designed to achieve a particular activity. It is a novel feature of the innovation to build this activity-centric infrastructure into the operating system such that every activity developer and user can benefit from the overall infrastructure.

The activity-centric system proposed herein is made up of a number of components as illustrated in FIG. 4. It is the combination and interaction of these components that compromises an activity-centric computing environment and facilitates the specific novel functionality described herein. At the lowest level the following components make up the core infrastructure that is needed to support the activity-centric computing environment; Logging application/user actions within the context of activities, User profiles and activity-centric environments, Activity-centric adaptive user interfaces, Resource availability for user activities across multiple devices and Granular applications/web-services functionality factoring around user activities. Leveraging these core capabilities with a number of higher-level functions are possible, including; providing user information to introspection, creating and managing workflow around user activities, capturing ad-hoc and authored process and technique knowledge for user activities, improving natural language and speech processing by activity scoping, and monitoring group activity.

Figure 5:
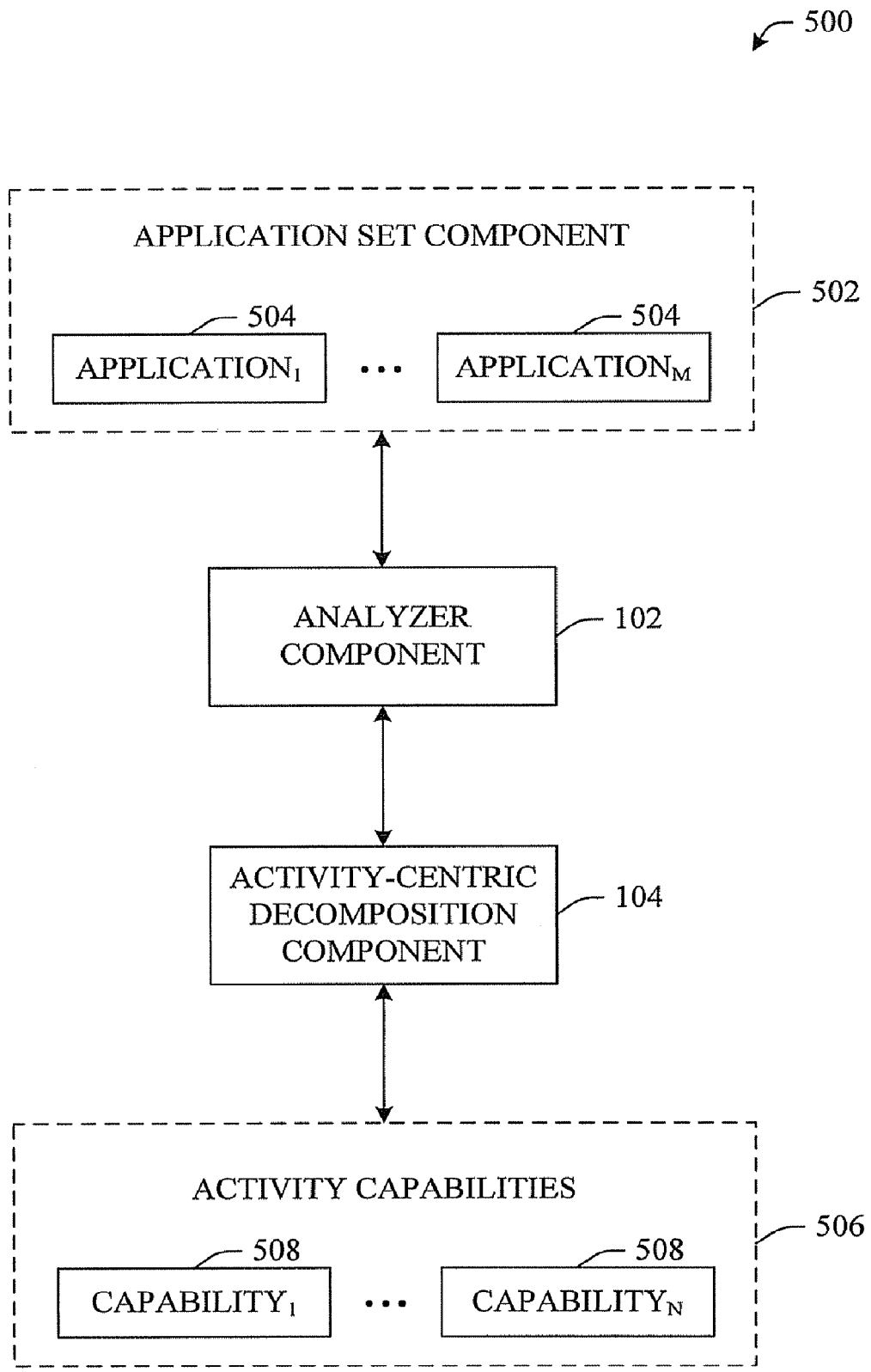
FIG. 5 illustrates an alternative activity-centric decomposition system in accordance with an aspect of the innovation.

Referring now to FIG. 5, a block diagram of a system 500 that facilitates aggregating activity capabilities in accordance with an aspect of the innovation is shown. Similar to system 100 as described with reference to FIG. 1, system 500 can include an analyzer component 102 and an activity-centric decomposition component 104. Additionally, system 500 can include an application set component 502 having 1 to M applications therein, where M is an integer. It will be understood that 1 to M applications can be described individually or collectively as applications 504. It is further to be understood that all or a subset of the applications can be located remotely from the activity analyzer 102 and/or activity centric decomposition component 104.

Additionally, system 500 can include an activity capabilities component 506 having 1 to N capabilities associated therewith, where N is an integer. It will be understood that 1 to N capabilities can be referred to individually or collectively as capabilities 508. These capabilities 508 can be representative of the application services and/or views described above.

The activity capabilities 508 can be identified and atomized from the applications 504 dynamically or on an as-need basis. In other words, in one aspect, the activity-centric decomposition component 104 can decompose applications 504 dynamically, as the applications 504 are discovered. In another aspect, the decomposition of application can be triggered by a particular need defined by an activity.

An "activity capability" 508 can represent a collection of functionality atoms. When an activity capability is coupled with an activity template, it is possible to instantiate an activity. Although distinct concepts, it is to be understood that activity capabilities 508 can exist within an activity template. In order to create enhanced synergy, a template author can incorporate activity capabilities 508 into a template.

Furthermore, as described supra, the activity capabilities 508 can be divided into services and views. Services refer to the computational transformations that have no user interface. Views are the user interfaces with some number of services beneath them. All of the services and views can be self-describing and discoverable. The whole framework is centered around these capabilities 508 working at the component level, being discoverable, being tested and being used at the component level; where traditional application frameworks are directed to building and testing applications.

Figure 6:
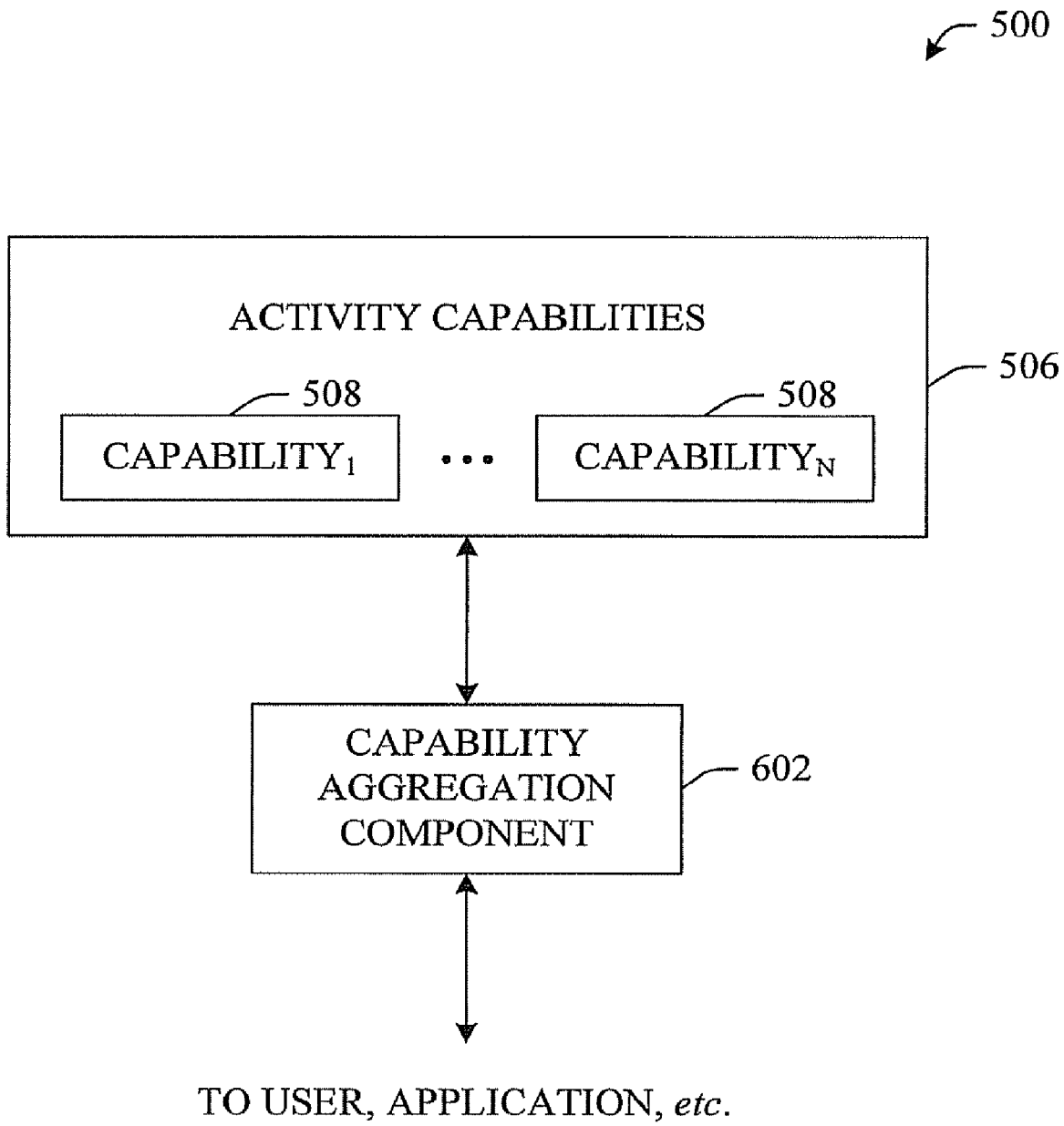
FIG. 6 illustrates an aggregation component in accordance with an aspect of the innovation.

Referring now to FIG. 6, a system 600 that gathers capabilities in accordance with an activity is shown. More particularly, system 600 can include a capability aggregation component 602 the can evaluate an inventory of capabilities 508 based upon an activity. For example, in accordance with an activity, the system 600, via the capability aggregation component 602, capabilities 508 can be combined into a collection that corresponds with an activity.

Figure 7:
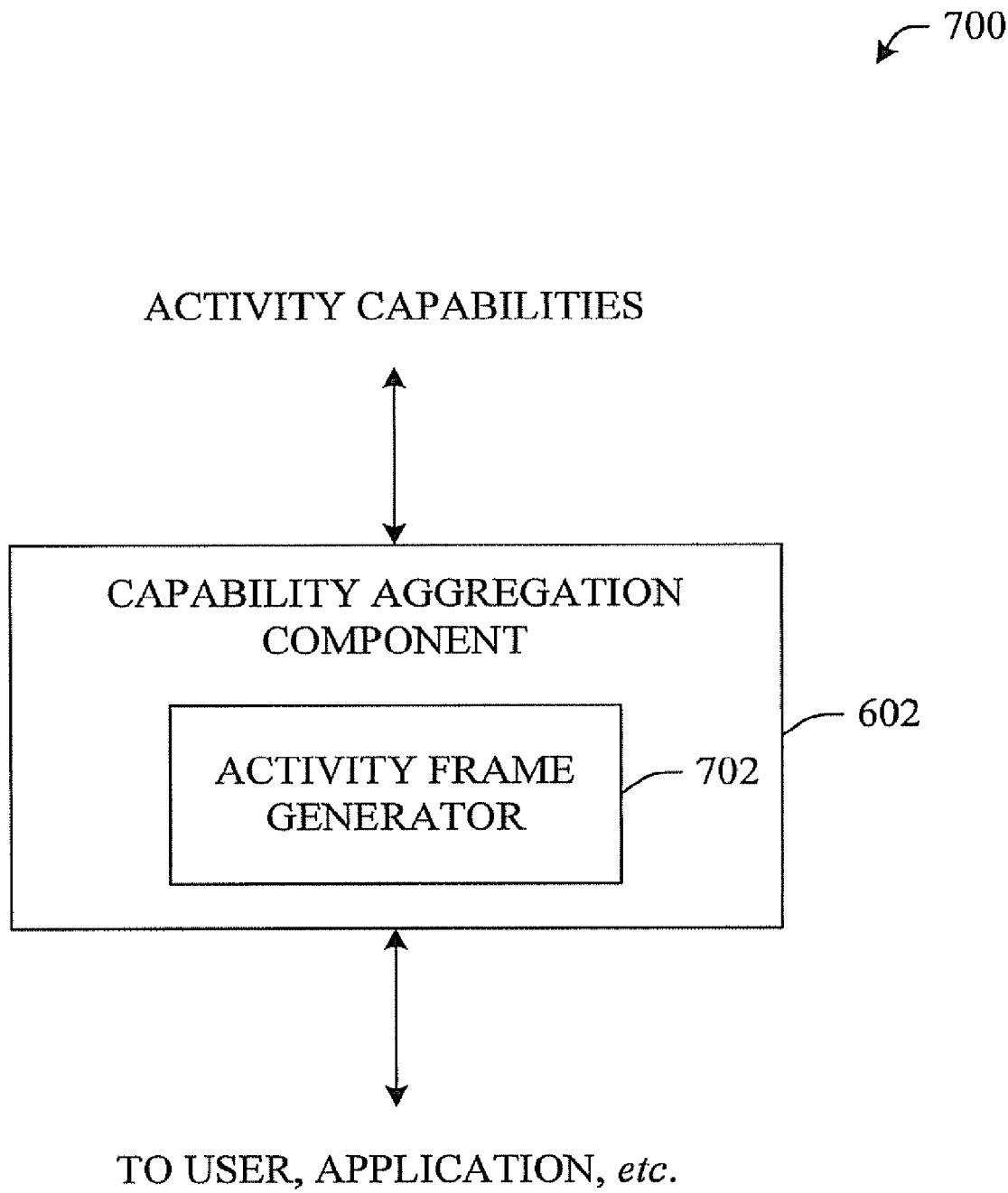
FIG. 7 illustrates an activity frame generator in accordance with an aspect of the innovation.

As shown in FIG. 7, a frame generator 702 can be employed to assist in gathering activity capabilities (e.g., 508 from FIG. 5). Generally, in an aspect, the activity frame generator 702 can facilitate construction of an activity frame in an ad hoc manner. As well, in other aspects, a template can be established by a user thus identifying capabilities associated with a particular activity. In ad hoc activity frame the user pulls capabilities into an activity as needed. For instance, the state of an activity can be employed to dynamically prompt access to a particular capability and/or group of activities. In another aspect, the frame can pull functionality in accordance with an activity template that a third party develops using atomized functionality components (e.g., activity capabilities).

Thus, the process of building an application can be categorized into two parts, the building the activity capabilities (e.g., the views, resources, functionality) that establish the application; and combining or aggregating the capabilities to build the application (e.g., the out-of-box experience). In operation, the innovation can automatically and/or dynamically decompose an application into any number of activity capabilities. In other aspects, capabilities can be externally developed by application programmers, activity developers, third parties or the like. It is to be understood that externally developed capabilities can be combined with dynamically atomized capabilities.

In accordance with the innovation, an application developer can author activities and build components (e.g., capabilities) that power the activities. In a specific example, a developer can build retirement planning, personal finance and tax planning activities within a financial application. As well, functionality can be pulled and used from other applications with respect to an activity. For example, the system can use a charting system of a spreadsheet program within a financial application. Moreover, a third party can create a personal finance activity that can also be utilized within higher level financial application.

Figure 8:
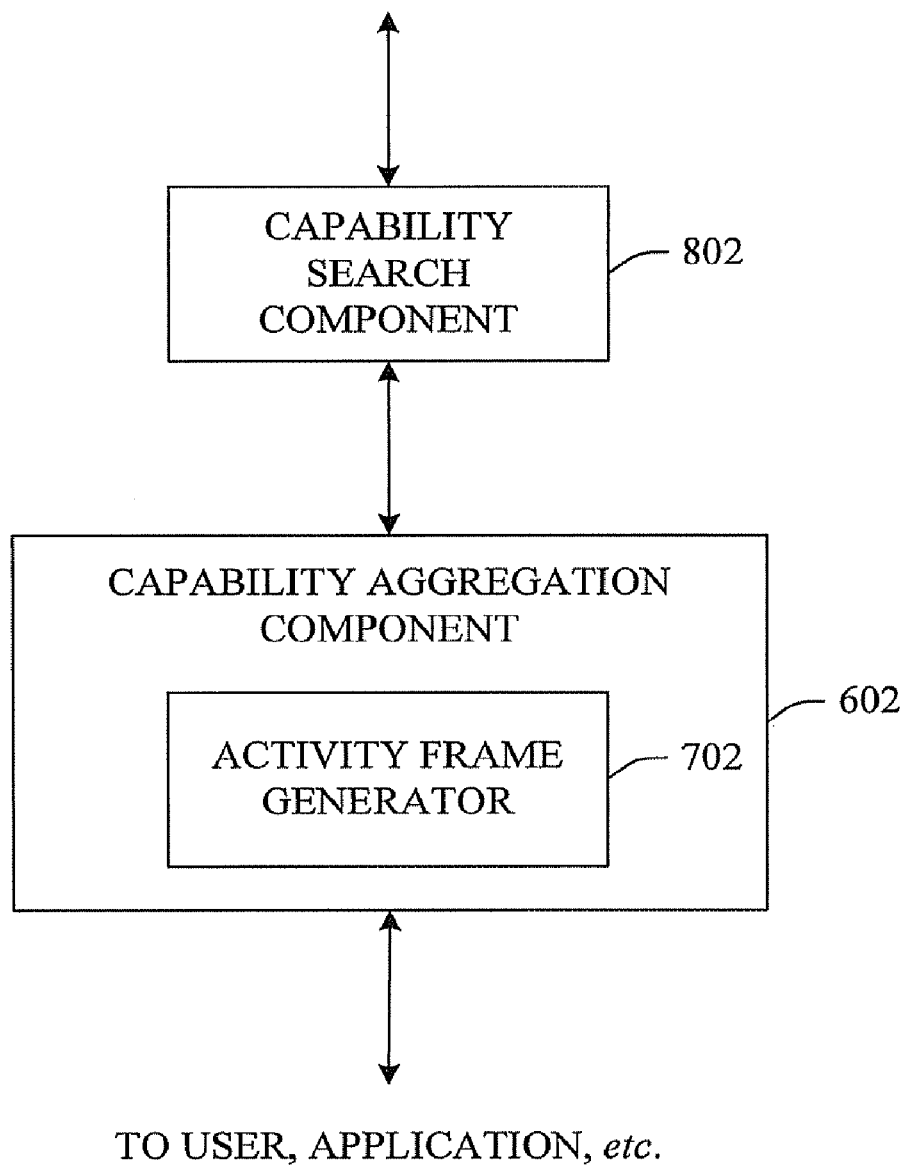
FIG. 8 illustrates an activity-centric system that facilitates a search component that discovers capabilities associated to an activity in accordance with an aspect of the innovation.

Referring now to FIG. 8, a system 800 that enables discovery of activity capabilities in accordance with an aspect of the innovation is shown. The capability aggregation component 602 can employ remote capabilities (e.g., via the Internet, remote data stores . . . ) as well as local services and/or views when linking capabilities. As described above, the innovation can enable construction of templates that define functionality or ad hoc mechanisms where characteristics of an activity can enable a user to pull functionality from any source domain, local and/or remote.

In one aspect, the innovation can automatically determine where to pull functionality and/or resources. For example, the decision can be based upon an activity context, user context, environment context, device profile or the like. In accordance with a specific example, if a user is employing a handheld device, the system can pull functionality from remote sources (or server-side functionality) in view of the limited processing power and memory storage of the handheld device. On the other hand, if the user is working on a desktop computer, the system might access local functionality and resources associated with an activity.

Referring again to FIG. 8, system 800 further includes a capability search component 802 which can prompt automatic capability discovery. As well, the capability search component 802 can enable a user to originate a capability query (e.g., alphanumeric, verbal, visual). Once established, the search query can be executed upon available activity capabilities.

This capability search component 802 can establish the ability to find or locate the atomic capabilities associated with an activity. Conventionally, users are oftentimes not aware of all of the capabilities within a monolithic application. For instance, a user of a personal finance application might not be aware that the application includes college planning functionality. In these types of scenarios, the system 800 can enable a user to search for functionality associated to an activity. More particularly, the system can enable searching functionality purchased as well as functionality available for purchase on essentially any granular level from a variety of sources.

Figure 9:
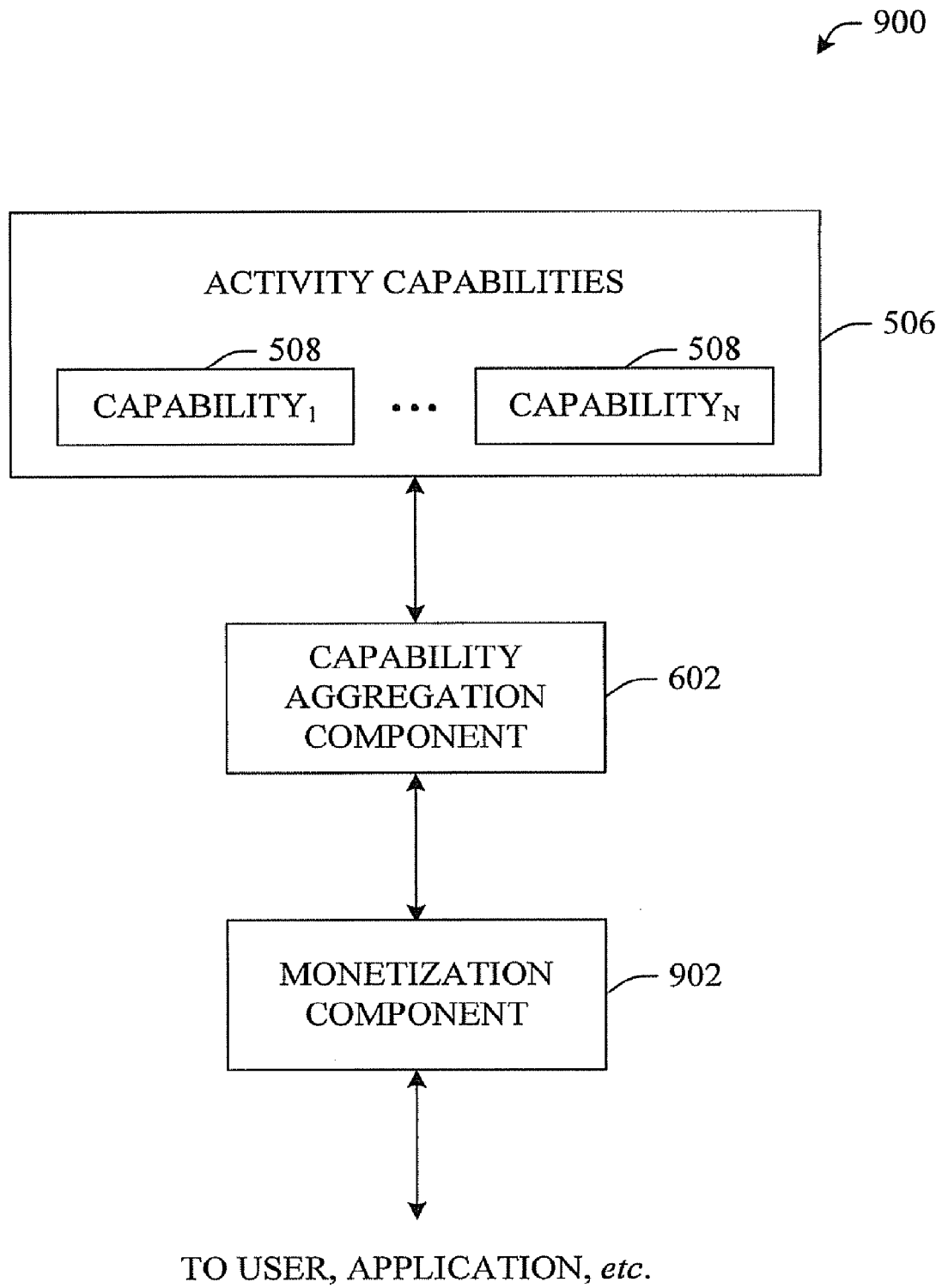
FIG. 9 illustrates an activity-centric system that facilitates capability monetization in accordance with an aspect of the innovation.

Another feature of the innovation is the ability to monetize use of capabilities. FIG. 9 illustrates a system 900 that includes a monetization component 902 in accordance with an aspect of the innovation. In one aspect, the monetization component 902 can enable a user to purchase, or a supplier to charge for, individual capabilities, (e.g., services, views) as needed and/or desired. With reference again to the financial application example above, the monetization component 902 can make it possible for a user to purchase tax functionality, personal finance functionality, etc. without purchasing the complete application. Rather, in conjunction with the activity-based capability functionality described supra, the system 900 can enable the tracking and monetization of activity capabilities in accordance with an aspect of the innovation.

Many times, users purchase the higher level capabilities and would, as a result, include access to the lower level capabilities. In other words, frequently, users would not purchase basic editing capabilities but, rather would purchase a higher level activity such as letter writing capabilities. However, in some instances, users would prefer to purchase high and low level capabilities based upon a particular activity or frequency of the activity. In doing so, the monetization component 902 can effectuate tracking the use of particular capabilities. In aspects, the granularity of the tracking can change based upon preference, activity, application, etc.

In summary, the subject innovation can apply an activity-centric focus upon atomizing functionality. In other words, in conjunction with the innovation described herein, the add-ins (e.g., services, views) can be triggered based at least upon an activity. In accordance with this model, it will be appreciated that some of the upgrades or plug-ins can have overlapping functionality. However, it is not necessary that the cost of the functionality be lower just because a user already has access to a related module.

Referring again to FIG. 9, system 900 can enable monetization of application functionality and activity capabilities 508. For example, rather than selling a new version of an application, as new functionality becomes available, the system 900 enables a license to functionality to be sold on an as needed or as desired basis. Further, atomized functionality can be made available across organizations with respect to an activity. For example, with respect to an activity, an atom of functionality can be supplied by company A where a disparate atom of functionality can be provided by company B.

In order to effectively monetize functionality, tracking mechanisms can be employed to determine use. Mechanisms that track use of the atomized functionality can be incorporated into the monetization component 902. Once tracking is available, the innovation can implement a distributed monetization model. The model can be used to effectuate revenue to flow back to the designer and/or owner of the activity.

The functionality tracking and/or logging feature refers to the ability to track what capabilities are being used with respect to an activity. Subsequently, the logging can be employed to effect distribution of monies associated with the use of atomized functionality. In one example, a user identifier (e.g., username/password) can be employed to track the use of the service and/or the view. Additionally, an activity identifier can be added to associate the user to a particular activity.

Overall, the functionality of the monetization component 902 enables a user to purchase functionality on a "per use" basis. For example, an X-month use license can be purchased where, at the end of the term, the user no longer has rights to the atomized functionality. As well, "per use" can be defined by time, number of uses, number of users, scope of use, etc. In another example, the monetization can be based upon the type of use (e.g., education, non-profit). Still further, monetization can vary based upon the activity as opposed to the type of functionality.

In a monetization scenario, it can be particularly important to distinguish between the ability to use the functionality to produce items and the ability to employ the functionality to use items created while under license. For example, in some cases, the functionality will be used to create a document (e.g., letter). Once the license expires, the capability can be made available to view the document created although the functionality of creating documents is no longer available. For example, there can be a letter writing package and a letter reading package which are initially sold as a single package but, over time, the writing package expires and the reading package survives. It is to be understood that the specifics of the monetization component can vary based upon factors including, but not limited to, capability type, activity context, user context, environment context, device profile or the like.

In accordance with monetization, the innovation can scale complexity within an activity. For example, the complexity can be scaled within a single activity based upon user capabilities, context, device profile, user role, etc. This functionality is in contrast to scaling capabilities across activities.

The atomization model of the subject innovation discloses separating an application's functionality into activity capabilities. Generally, there are two categories of capabilities: services (resources, functionality) and views. As described above, with these categories of capabilities, it is possible to establish an activity template. These templates can be authored by the developer of the application (e.g., word processor) or by a third-party who can actually use the capabilities from the application toolbox to accomplish an activity.

Therefore, in accordance with the word processor scenario, if a user purchases an activity template to write letters, the template can include everything necessary to write a letter. If however, the user wants to do something that is not available via the template (e.g., creating a bar chart), the innovation enables additional capabilities to be discovered and/or located. For instance, in the example, the bar chart creation capability can be a capability that is already resident on the machine. As such, the user can search the capabilities on the machine to identify a desired capability. Moreover, the capability can be located and obtained from another source (e.g., Internet, third party, remote store).

In another specific example, the innovation can be used in connection with card making ability to create invitations for a particular party. The monetization component 902, together with the capability aggregation component 602, can limit the use of this functionality to creating invitations for the particular party. The activity-centric innovation can further enable use of the functionality for any other purpose to be purchased on a per use basis. Still further, in accordance with the subject innovation, the scope of the functionality can be modified in accordance with activity requirements and/or the price. In all, the subject innovation provides a mechanism that allows people to build, or discover, these flexible activity capabilities which effectuate the redistribution ability to compensate the component provider for an activity.

In furtherance of the functionality described above, the innovation can employ an artificial intelligence (AI) and/or machine learning and reasoning (MLR) mechanisms which facilitate automating one or more features in accordance with the subject innovation. The subject innovation (e.g., in connection with capability decomposition, aggregation, monetization . . . ) can employ various AI-based schemes for carrying out various aspects thereof. For example, a process for determining when to aggregate functionality or where to locate an activity capability can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic, statistical and/or decision theoretic-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. By defining and applying a kernel function to the input data, the SVM can learn a non-linear hypersurface. Other directed and undirected model classification approaches include, e.g., decision trees, neural networks, fuzzy logic models, naïve Bayes, Bayesian networks and other probabilistic classification models providing different patterns of independence can be employed.

As will be readily appreciated from the subject specification, the innovation can employ classifiers that are explicitly trained (e.g., via a generic training data) as well as implicitly trained (e.g., via observing user behavior, receiving extrinsic information). For example, the parameters on an SVM are estimated via a learning or training phase. Thus, the classifier(s) can be used to automatically learn and perform a number of functions, including but not limited to determining according to a predetermined criteria what granularity should be employed, when to aggregate capabilities, where to locate capabilities, how to set monetization criteria, etc.

Figure 10:
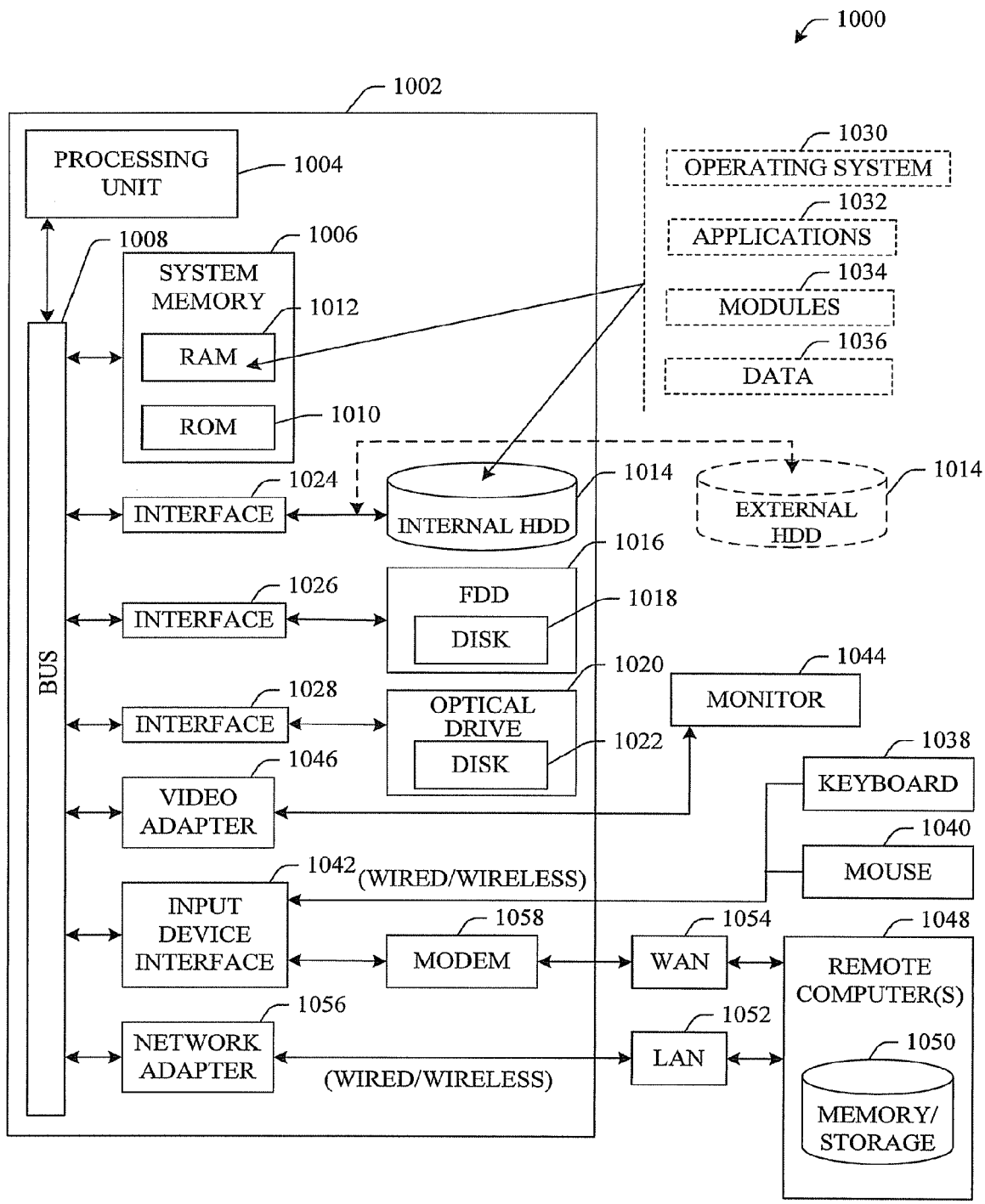
FIG. 10 illustrates a block diagram of a computer operable to execute the disclosed architecture.

Referring now to FIG. 10, there is illustrated a block diagram of a computer operable to execute the disclosed architecture of decomposing and/or monetizing granular functionality in accordance with an aspect of the innovation. In order to provide additional context for various aspects of the subject innovation, FIG. 10 and the following discussion are intended to provide a brief, general description of a suitable computing environment 1000 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the innovation includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the innovation can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
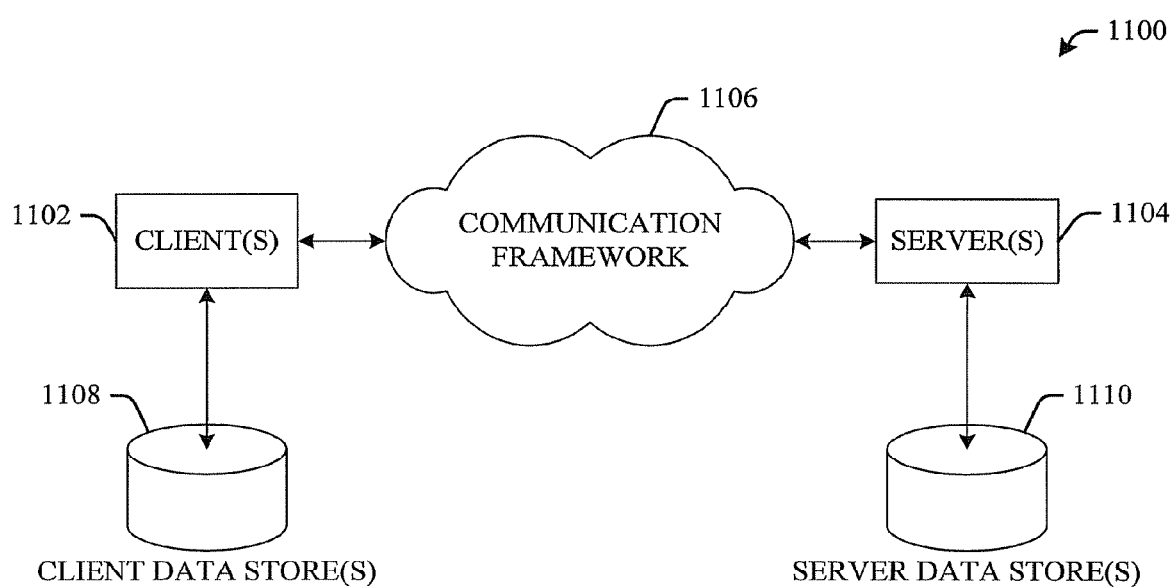
FIG. 11 illustrates a schematic block diagram of an exemplary computing environment in accordance with the subject innovation.

Referring now to FIG. 11, there is illustrated a schematic block diagram of an exemplary computing environment 1100 in accordance with the subject innovation. The system 1100 includes one or more client(s) 1102. The client(s) 1102 can be hardware and/or software (e.g., threads, processes, computing devices). The client(s) 1102 can house cookie(s) and/or associated contextual information by employing the innovation, for example.

The system 1100 also includes one or more server(s) 1104. The server(s) 1104 can also be hardware and/or software (e.g., threads, processes, computing devices). The servers 1104 can house threads to perform transformations by employing the innovation, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates activity-centric atomization of an application, comprising:
   evaluating, at a computing device, an application to identify capabilities within the application;
   separating, at a computing device, the application into a plurality of activity capabilities that are used to complete an activity, wherein the activity is a real world task completed by a user, and wherein the plurality of activity capabilities are identified through a probabilistic analysis of observed events that previously occurred through the application;
   monetizing the plurality of activity capabilities of the application based upon usage data of the plurality of activity capabilities to determine how much of a fee to charge for using one or more of the plurality of activity capabilities, wherein usage data comprises the probabilistic analysis of observed events in the application associated with the plurality of capabilities; and
   displaying a user interface that only includes the plurality of activity capabilities.

2. The method of claim 1, wherein the plurality of activity capabilities comprises a service, and wherein the service is at least one of a functionality and a resource.

3. The method of claim 2, wherein the method further comprises monetizing the service.

4. The method of claim 1, wherein the plurality of activity capabilities comprises a view, and wherein the view is a mechanism to display functionality aspects to the user.

5. The method of claim 1, wherein a subset of the plurality of activity capabilities is located remotely from the other of the plurality of activity capabilities.

6. The method of claim 1, wherein the method further comprises offering a new functionality of the application to the user for a per use fee and tracking use of the functionality.

7. The method of claim 1, further comprising:
   combining a subset of the plurality of activity capabilities based at least in part upon the activity further; and
   defining an activity frame that identifies the subset of the plurality of activity capabilities associated with the activity, wherein the activity frame is an ad hoc template, wherein the user pulls activities into the activity frame as needed.

8. The method of claim 1, wherein the method further comprises enabling viewing of an item created by an application functionality purchased on a per use basis without additional fees by providing a reading functionality to the application that does not require a fee for use.

9. The method of claim 1, wherein the probabilistic analysis is performed by a classifier that maps an input attribute vector for a capability to a confidence that the input attribute vector belongs to a class corresponding to the activity.

10. The method of claim 1, further comprising employing at least one of a probabilistic and a statistical-based analysis that infers an action that a user desires to be automatically performed.

11. The method of claim 10, wherein the action is an aggregation of a subset of the plurality of activity capabilities.

12. One or more computer-storage media having computer-executable instructions embodied thereon, that when executed by a computing device perform a method that facilitates activity-centric atomization of an application, the method comprising:
   evaluating an application to identify capabilities within the application;
   separating the application into a plurality of activity capabilities that are used to complete an activity, wherein the activity is a real world task completed by a user, and wherein the plurality of activity capabilities are identified through a probabilistic analysis of observed events that previously occurred through the application;
   determining a fee that should be charged for using one of the plurality of activity capabilities by analyzing usage data, wherein usage data comprises the probabilistic analysis of observed events in the application associated with the plurality of capabilities; and
   displaying a user interface that only includes the plurality of activity capabilities with the fee for the one of the plurality of activity capabilities, wherein the user interface is associated with the application.

13. The media of claim 12, wherein the plurality of activity capabilities comprises a service, and wherein the service is at least one of a functionality and a resource.

14. The media of claim 12, wherein the method further comprises receiving a request to activate one of the activity capabilities and enabling related capabilities to be located by a user as an activity capability is used.

15. The media of claim 12, further comprising employing at least one of a probabilistic and a statistical-based analysis that infers an action that a user desires to be automatically performed, wherein the action is an aggregation of a subset of the plurality of activity capabilities.

16. The media of claim 15, further comprising making the action available to a user for a particular use only.

17. The media of claim 12, wherein the probabilistic analysis is performed by a function that maps an input attribute vector for a capability to a confidence that the input attribute vector belongs to a class corresponding to the activity.

18. One or more computer-storage media having computer-executable instructions embodied thereon, that when executed by a computing device perform a method that facilitates activity-centric atomization of an application, the method comprising:
   evaluating an application to identify capabilities within the application;
   separating the application into a plurality of activity capabilities that are used to complete an activity, wherein the activity is a real world task completed by a user, and wherein the plurality of activity capabilities are identified through a probabilistic analysis of observed events that previously occurred through the application;

determining a fee that a user should be charged for using one of the plurality of activity capabilities by analyzing usage data, wherein usage data comprises the probabilistic analysis of observed events in the application associated with the plurality of capabilities; and displaying a user interface that only includes the plurality of activity capabilities with the fee for the one of the plurality of activity capabilities, wherein the user interface is associated with the application.

19. The media of claim 18, wherein the method further comprises receiving a selection of a single capability within the plurality of activity capabilities and tracking use of the single capability within the application.

20. The media of claim 19, wherein the method further comprises charging a per use fee to the user according to information gathered during the tracking.

* * * * *